April 10, 1962 R. MATZ ET AL 3,029,196
ELECTRODIALYSIS OF AQUEOUS ELECTROLYTE SOLUTIONS
Filed Dec. 29, 1959 3 Sheets-Sheet 1

Reuven Matz
Chaim Forgacs
Samuel Perlmutter
Inventors

By *Karl F. Ross*
Agent

Reuven Matz
Chaim Forgacs
Samuel Perlmutter
Inventors

By Karl F. Ross
Agent

April 10, 1962   R. MATZ ET AL   3,029,196
ELECTRODIALYSIS OF AQUEOUS ELECTROLYTE SOLUTIONS
Filed Dec. 29, 1959   3 Sheets-Sheet 3

Reuven Matz
Chaim Forgacs
Samuel Perlmutter
Inventors

By Karl F. Ross
Agent

United States Patent Office 3,029,196
Patented Apr. 10, 1962

3,029,196
ELECTRODIALYSIS OF AQUEOUS ELECTROLYTE SOLUTIONS
Reuven Matz and Chaim Forgacs, Beersheba, and Samuel Perlmutter, Jerusalem, Israel, assignors to the State of Israel represented by the Prime Minister
Filed Dec. 29, 1959, Ser. No. 862,642
Claims priority, application Great Britain Mar. 25, 1959
7 Claims. (Cl. 204—180)

The present invention relates to the electrodialytic desalination of electrolyte solutions, such as brackish waters, sea water and other aqueous salt solutions.

Electrodialysis is a known procedure for the partial or near complete removal of electrolytes from their aqueous solutions with the aid of so-called ion-selective or permselective membranes which are either cation-permeable while preventing the transfer of anions, or anion-permeable while preventing the transfer of cations.

There exists a variety of apparatus for the desalination of water by electrodialysis which all comprise a stack of alternating cation-permeable and anion-permeable membranes disposed between two electrodes in such a manner that each two vicinal membranes, of which one is anion-permeable and the other cation-permeable, and the space between them constitute between them a cell. In operation a D.C. is passed through the cells and the solution is gradually diluted in every second cell owing to the migration of ions into the two neighboring cells where the solution is correspondingly concentrated, so that cells containing solution of increasing concentration ("concentrate cells") alternate with cells containing solution of decreasing concentration ("diluate cells"). The diluate cells are as a rule connected in parallel in one circulation system and the concentrate cells in the second one. The former is fed with crude or feed liquid and/or recycled diluate, and the later with feed liquid and/or recycled concentrate.

A known difficulty in the operation of these stacks consists in the fact that water-insoluble salts are deposited during the application of the operational D.C., on or within the membranes, on the separators and within the compartments, particularly in the concentrate cells. The scale thus forming increases the electrical and hydraulic resistance and blocks the hydraulic distribution system, whereby the efficiency of the stacks is lowered.

The scale consists as a rule mainly of the carbonates, hydroxides and sulphates of alkaline-earth metals, especially calcium carbonate and sulphate and magnesium hydroxide.

Various ways for overcoming this difficulty have already been suggested. According to one of these methods the water is chemically softened before it is submitted to electrodialysis, for example, by the known lime-soda-treatment or by base exchange. According to another method the pH of the liquid in the concentrate cells is kept low by the addition of acids. Both these known methods are costly in that they require the use of additional expensive apparatus and chemicals, and in addition the second method requires that the entire installation including the pipes, pumps, and the like, be made acid-resistant, for example, by being lined with rubber, a plastic or the like.

By another known method, the amount of scale already formed on the membranes is reduced by the reversal at certain time intervals of the direction of the operational D.C., in which case the electrode serving as anode in normal operation becomes the cathode, and vice versa. This reversal of polarity also brings with it a reversal of the functions of the cells: the diluate cells become concentrate cells and vice versa. Accordingly, each reversal of polarity has to be accompanied by a simultaneous reversal of the flow of liquid, which is an obvious disadvantage. The reversal of the electric current is normally done at relatively long intervals only; it entails a serious decrease of output and efficiency of the plant and requires the use of further equipment.

It is the object of the present invention to provide a method for the prevention of the formation of scale on and within the membranes, on the separators and within the cells of electrodialysis apparatus, which is convenient, simple and inexpensive both in terms of capital investment and operational costs, and which does not require the addition of chemicals.

This object is achieved, in accordance with the invention, in that the normal flow of the operational D.C. through the cells is periodically disturbed at short intervals in such a manner that during at least part of the disturbance the voltage vector has a value different from the maximum value of the voltage vector during the normal flow of the operational D.C.

This definition, therefore, includes the following possible disturbances:

(a) Simple interruption of the D.C.
(b) Temporary reversal of direction of the D.C.
(c) Interruption of the D.C. and application of an A.C. pulse.

The D.C. used in electrodialysis is in many cases a rectified A.C., that is a pulsating current with given period and amplitude. For the purposes of the present invention the interruption between the pulses of a pulsating D.C. are not to be considered as disturbances of the normal flow of current or, in other words, a pulsating D.C. is considered as a "normal flow" in the same manner as a continuous D.C., while a disturbance of such normal flow is one which brings about inside the cells an electric state which is different in terms of voltage and/or polarity from the electric state prevailing during the normal flow of the operational D.C.

The ratio between the length of each period of normal flow of current between each two disturbances and the duration of one such disturbance may vary within wide limits, but preferably this ratio should be 4:1 or greater.

The invention is illustrated, by way of example only, in the accompanying diagrams and drawings in which.

Figure 1:
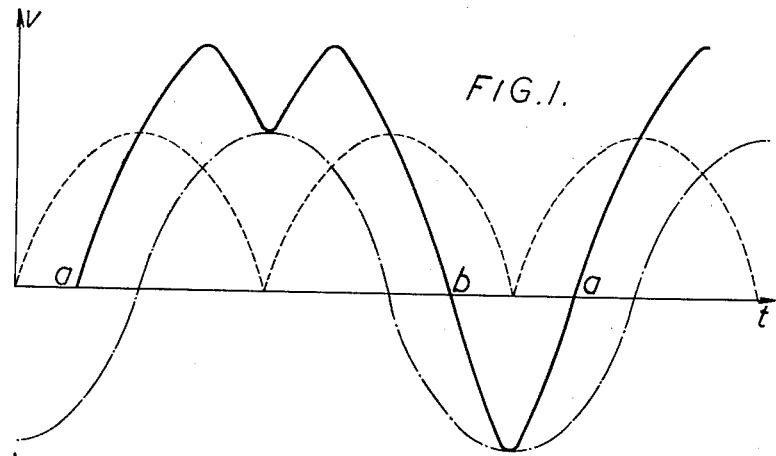
FIGS. 1 to 4 are graphs of direct currents periodically disturbed in four different manners in accordance with the invention, the time being plotted on the abscissae, and voltages on the ordinates.

In the performance of the method according to the invention in a first embodiment thereof, periodically recurring disturbances are produced in the operational rectified D.C. by the superimposition of an A.C. The superimposed A.C. may be of the same or different period as the pulsating D.C. In the former case it will have to be of different phase than the D.C. The amplitudes, periods and/or phases of the two currents are so chosen that the resultant current undergoes a periodically recurring reversal of direction of comparatively short duration. For example, if an A.C. of 50 cycles per second is superimposed on a full wave rectified D.C. of 2×50 cycles per second with a phase difference of 90°, a curve like that shown in FIG. 1 is obtained. The disturbances are represented by the troughs extending below the abscissa, and the normal flow of operational current by the rippled stretches between the troughs. The duration of each period of normal flow of the current between points *a* and *b* of the curve is ~0.016 second, and the duration of each disturbance between points *b* and *a* is ~0.004 second. In FIG. 1 the pulsating D.C. is symbolized by the dashed line, the superimposed A.C. by the dash-dotted line and the resultant current by the continuous line.

Figure 2:
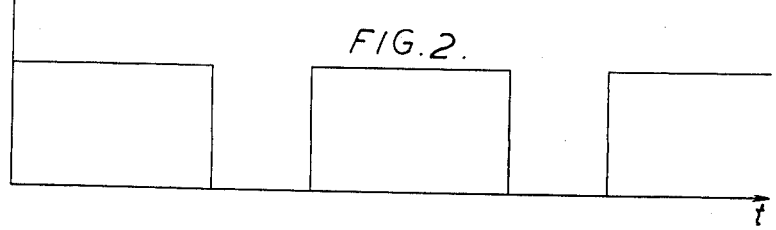

According to another method, diagrammatically illustrated in FIG. 2, the D.C. is periodically interrupted.

Figure 3:
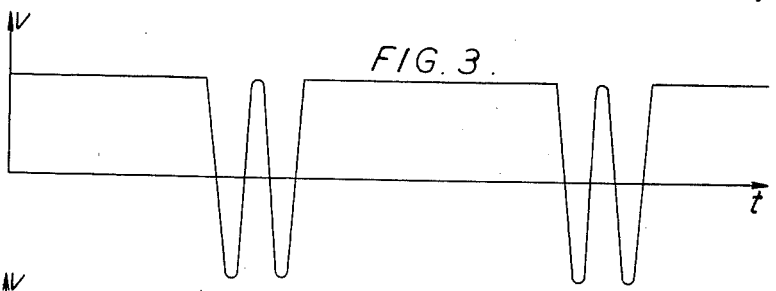

By a third method, illustrated diagrammatically in FIG. 3, the D.C. is similarly interrupted as in the case of FIG. 2, and in addition an A.C. is passed through the cells during the interruptions of the D.C.

Figure 4:
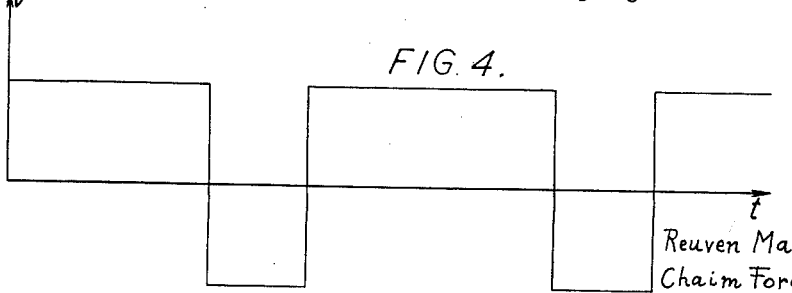

According to the method diagrammatically illustrated in FIG. 4, the D.C. is interrupted similarly as in the case of FIG. 2, and during these interruptions, D.C. of opposite direction is flown through the cells.

In FIGS. 2, 3 and 4 the D.C. has been symbolized by continuous lines, but it is to be understood that these may mean either continuous or rectified D.C.

Figure 5:
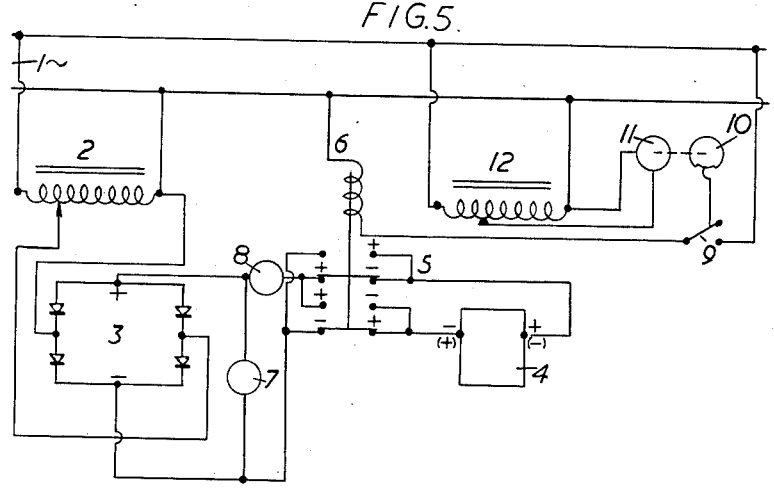
FIGS. 5 and 6 are wiring diagrams of two electrodialysis plants adapted to the performance of the invention in two different manners.

FIG. 5 is a wiring diagram for an electrodialysis plant in which the operational D.C. is periodically interrupted and a D.C. of reversed polarity and short duration is produced in accordance with the graph shown in FIG. 4. An A.C. supply line 1 is connected to a variable transformer 2. The secondary of transformer 2 is connected to a rectifier 3 whose output terminals are connected to the stack 4 of electrodialysis cells via a double throw switch 5 operable by a relay 6. The feed circuit of the stack 4 also includes a bypass voltmeter 7 and an ammeter 8 in series. Relay 6 is supplied with current from the supply line 1 through a spring-loaded switch 9. This switch is periodically closed and opened by a rotary cam member 10 rotated by a motor 11. The latter is supplied with current from the supply line 1 through a variable transformer 12. The switch 5 is designed as a commutator switch which, in its normal position in which the relay 6 is not energized, passes the operational D.C. to the stack 4 in one direction and upon actuation of the relay 6 reverses the direction of the D.C. passing through the stack. The relay 6 is energized when the switch 9 is closed by the action of cam member 10.

Figure 6:
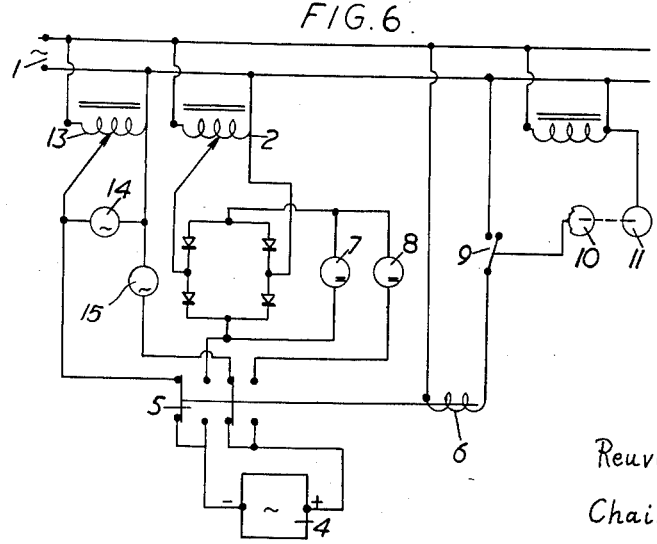

In the arrangement illustrated diagrammatically by FIG. 6 an A.C. is passed through the stack during the interruptions of the normal flow of the operational D.C., as indicated by the graph of FIG. 3. This arrangement is similar to that according to FIG. 5 and comprises an A.C. supply line 1, a variable transformer 2, rectifier 3, ammeter 8, voltmeter 7, the stack 4, and a double-throw switch 5 operated by a relay 6 whose circuit is controlled by a switch 9 operated by a cam member 10 rotated by a motor 11 which latter is supplied with current from the supply line 1 through a variable transformer 12. The circuit of the alternative pair of poles of the double-throw switch 5, i.e. the one connected in the supply circuit of the stack upon actuation of relay 6, is connected to the supply line 1 through a variable transformer 13 and includes a voltmeter 14 and an ammeter 15.

When switch 9 is closed by the action of the cam member 10, the relay 6 is energized and shifts the double-throw switch 5 from the position illustrated in FIG. 6 into the alternative position and the operational D.C. passes through stack 4. When the recess of cam member 10 faces switch 9 the latter opens owing to the action of its spring, relay 6 is de-energized and switch 5 shifts back into the position illustrated in FIG. 6, in which position the terminals of stack 4 are connected to the secondary of the variable transformer 13 with the result that an A.C. passes through the stack. This cycle repeats itself as long as cam member 10 keeps revolving about its axis.

The performance of the invention is illustrated by the following examples to which it is not limited.

EXAMPLE 1

In this and the following examples, the results of the method according to the invention as regards the prevention or decrease of scale formation were tested against a "blank" run in which no scale control was introduced. The comparison between the operational runs under scale-control conditions and "no-control" conditions was determined by the following two parameters.

(1) Voltage change occurring across the electrodialysis apparatus.

(2) Measured amount of scale found in the apparatus.

1000 litres of brackish water were desalted in five consecutive batches of 200 litres each in an electrodialysis apparatus comprising 10 cation-permeable membranes and 10 anion-permeable membranes, all of them free from scale and having an active surface of 375 cm.$^2$ each. A direct current of 10 milliamperes/cm.$^2$ was passed through the apparatus but was periodcially interrupted for a period of 0.35 second at intervals of 1.4 seconds of normal flow. During each of these interruptions of 0.35 second, a 50 cycle alternating current of 4 amperes was applied. During the desalination of the five consecutive 200 litre batches the stack was not opened. After the total of 1000 litres was thus treated, the stack was opened and the quantity of scale formed measured.

In the "blank" test, another 1000 litres of the same brackish water was similarly desalted in five consecutive 200-litre batches in the same apparatus with scale-free membranes under the same conditions, but a continuous direct current of 10 milliamperes/cm.$^2$ was passed without interruptions. At the end of the runs, the stack was treated as above.

In the stack after the "blank" run, layers of hard crystalline deposits were found on the surface of the membranes (particularly the anion-selective membranes) in the concentrate cells, and a soft sludge was found within the cells and on the spacers. After the operational run, no similar hard deposits were found on the membranes, but some sludge was found in the concentrate cells.

In both runs the amperage of the D.C. passing through the cells was kept constant. To the extent that this required a raise of the operating voltage in the course of the run such raise was achieved by the adjustment of the variable transformer (FIG. 6).

*Total Weight of Scale Plus Sludge Found in the Cells*

|  | Blank Run, grams | Operational Run, grams |
| --- | --- | --- |
| $CaCO_3$ | 21.4 | 6.8 |
| $Mg(OH)_2$ | 2.8 | 0.6 |

*Starting and Final Voltages Across Stack*

|  | (1) batch, volts | (2) batch, volts | (3) batch, volts | (4) batch, volts | (5) batch, volts |
| --- | --- | --- | --- | --- | --- |
| Blank test: |  |  |  |  |  |
| For 1,500 p.p.m. NaCl | 22 | 24 | 28 | 53 | 81 |
| For 1,000 p.p.m. NaCl | 26 | 38 | 41 | 74 | 95 |
| For 750 p.p.m. NaCl | 29 | 34 | 53 | 85 | (*) |
| For 500 p.p.m. NaCl | 34 | 43 | 52 | (*) | (*) |
| Test according to the invention: |  |  |  |  |  |
| For 1,500 p.p.m. NaCl | 25 | 24 | 22 | 22 | 24 |
| For 1,000 p.p.m. NaCl | 28 | 25 | 24 | 24 | 25 |
| For 750 p.p.m. NaCl | 30 | 30 | 28 | 27 | 28 |
| For 500 p.p.m. NaCl | 36 | 36 | 37 | 35 | 36 |

*The voltage was higher than could be measured by means of the voltmeter used during the experiments.

It is seen that while in the blank test the voltage across the stack had to be raised gradually from batch to batch, it remained substantially constant in the test according to the invention. This shows that while during the former test an increase of electric resistance owing to scale formation occurred, no such increase occurred during the latter test.

*Analysis of Brackish Feed Water*

| | P.p.m. |
|---|---|
| $Ca^{++}$ | 250 |
| $Mg^{++}$ | 100 |
| $Cl^-$ (as NaCl) | 1650 |
| $SO_4^{--}$ | 650 |
| $HCO_3^-$ | 270 |

EXAMPLE 2

1000 litres of brackish water having the same composition as indicated in Example 1 were electrodialysed in five 200-litre batches in the same stack with clean membranes and under the same condition as in Example 1. The operational D.C. of 4 amperes was periodically interrupted, the period of normal flow being 9 seconds while the duration of each interruption was 0.45 second. During each interruption of 0.45 second, a direct current pulse of 4 amperes with an opposite polarity was applied. At the end of the experiment the amount of scale of the membranes was determined as described in Example 1.

*Total Weight of Deposit Found on the Membranes*

| | Grams |
|---|---|
| $CaCO_3$ | 5.3 |
| $Mg(OH)_2$ | 0.6 |

*Starting and Final Voltages Across the Stack*

| | (1) batch, volts | (2) batch, volts | (3) batch, volts | (4) batch, volts | (5) batch, volts |
|---|---|---|---|---|---|
| For 1,500 p.p.m. NaCl | 22 | 24 | 22 | 22 | 24 |
| For 1,000 p.p.m. NaCl | 25 | 25 | 25 | 24 | 25 |
| For 750 p.p.m. NaCl | 29 | 30 | 28 | 28 | 29 |
| For 500 p.p.m. NaCl | 36 | 36 | 37 | 35 | 36 |

EXAMPLE 3

Another batch of water of the same composition as in Examples 1 and 2 was electrodialysed in the same stack. The operational D.C. of 4 amperes was periodically interrupted, the period of normal flow being 6 seconds, and the duration of each interruption 0.45 second. During these interruptions no electrical current was applied to the system.

*Total Weight of Deposit Found on the Membranes*

| | Grams |
|---|---|
| $CaCO_3$ | 9.9 |
| $Mg(OH)_2$ | 1.2 |

*Starting and Final Voltages Across Stack*

| | (1) batch, volts | (2) batch, volts | (3) batch, volts | (4) batch, volts | (5) batch, volts |
|---|---|---|---|---|---|
| For 1,500 p.p.m. NaCl | 23 | 23 | 23 | 24 | 25 |
| For 1,000 p.p.m. NaCl | 25 | 25 | 25 | 25 | 26 |
| For 750 p.p.m. NaCl | 30 | 28 | 30 | 30 | 31 |
| For 500 p.p.m. NaCl | 35 | 36 | 37 | 36 | 37 |

EXAMPLE 4

Figure 7:
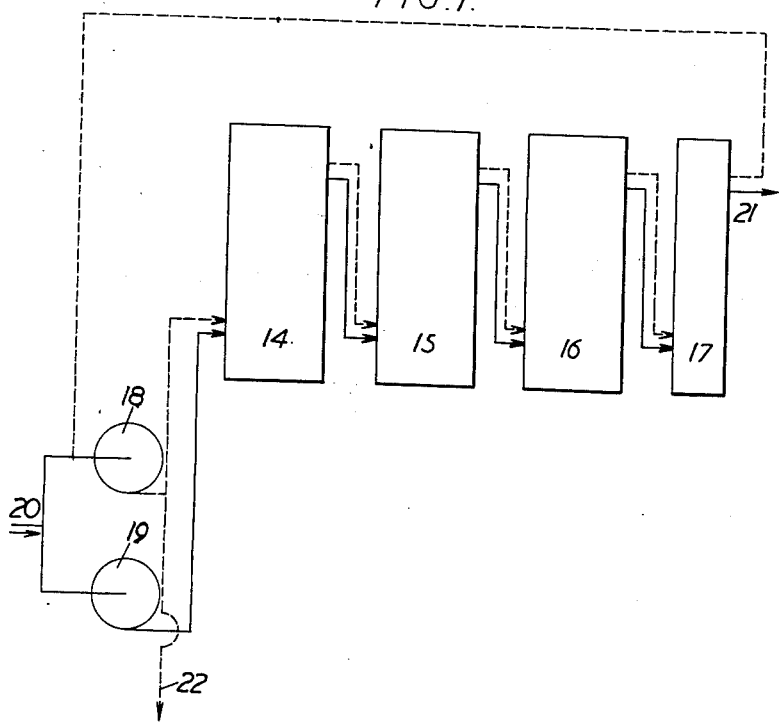
FIG. 7 is a flow sheet showing the operation of one form of an electrodialysis plant to which the invention can be adapted.

Saline water containing 3.000 parts per million of dissolved solids was continuously passed without any pretreatment through a four-stage electrodialysis apparatus in accordance with the flow-sheet of FIG. 7. The apparatus had three stacks 14, 15 and 16 with 50 pairs of membranes each, and a fourth stack 17 having only 25 pairs of membranes. Feed water was introduced at 20. The concentrate was recycled by means of a pump 18, and the diluate cycled by means of a pump 19. A part of the feed water was diverted to the recycling concentrate as a make-up liquid while the remainder was introduced into the diluate cycle for desalination. The desalinated water was discharged at 21, the concentrate reject was discharged at 22 at a concentration of 10.000 p.p.m.

The water was passed through the plant at a rate of 1.2 m.$^3$ per hour; the flow velocity was 4.3 cm. per second in stacks 14, 15 and 16, and 8.6 cm. per second in stack 17. During the entire run constant current densities of 20, 20, 15 and 15 milliamperes/cm.$^2$, respectively, were maintained in each of the four stacks. Periodic interruptions of the operational D.C. of 0.6 second duration were made at intervals of 6 seconds, and during the interruptions a D.C. of the same amperage but of reversed polarity was applied. Thus the applied operational D.C. lasted for periods of 5.4 seconds, and the disturbances for periods of 0.6 second. The apparatus was operated under these conditions for a period of 100 hours. The following results were obtained.

*Stack Voltages*

| | Initial Volts | Final Volts |
|---|---|---|
| Stage 1 | 100 | 100 |
| Stage 2 | 105 | 75 |
| Stage 3 | 94 | 105 |
| Stage 4 | 73 | 75 |

This table indicates that no appreciable scale formation occurred. This was confirmed when the apparatus was dismantled and examined.

A control run carried out under the same conditions but without scale-control had to be stopped after 15 hours owing to blockage of the distribution channels and a serious rise in voltage (175, 185, 105, 120 volts, respectively, in each of the four stacks) as a result of scale deposition on the membranes.

EXAMPLE 5

Untreated saline water of similar composition to that used in Example 4 was passed continuously through a stack with 50 pairs of membranes at a velocity of 3 cm. per second. Scale control was effected by the interruption of the D.C. at intervals of 6 seconds and the introduction of an alternating current of the same frequency and amplitude as the operational rectified D.C., for a period of 0.6 second. The applied current density was 20 milliamperes over 50 pairs of membranes. After a period of 100 hours no change in voltage was observed, the value remained at the initial level of 140 volts. On opening the stack no sign of scale was observed.

What we claim is:

1. A process for electrodialytically desalting a saline solution, comprising the steps of directing said saline solution in a continuous flow through a succession of spaced alternatingly cation-permeable and anion-permeable permselective membranes, passing a current in a unidirectional sense through said succession of membranes, thereby concentrating said solution between alternate pairs of membranes and diluting said solution between the remaining pairs of said membranes, and periodically interrupting in successive cycles the flow of current in said sense prior to the onset of scale formation during said continuous flow for an interval of finite duration corresponding to a substantial fraction of the length of a cycle, the maximum ratio of said duration to the remainder of the cycle being substantially 1:4.

2. A process according to claim 1 wherein said unidirectional current is raw-rectified alternating current which is interrupted by superimposition thereon of an alternating current of a phase different from that of said raw-rectified alternating current.

3. A process according to claim 1 wherein said unidirectional current is a raw-rectified alternating current which is interrupted by superimposition thereon of an alternating current of a frequency different from that of said raw-rectified alternating current.

4. A process according to claim 1 wherein a reverse current is caused to flow during at least part of said interval.

5. A process according to claim 4 wherein an alternating current is caused to flow during said interval.

6. A process according to claim 5 wherein said alternating current has a period less than the duration of said interval.

7. A process for electrodialytically desalting a saline solution, comprising the steps of flowing said solution through a succession of spaced alternatingly cation-permeable and anion-permeable permselective membranes, passing a current in a unidirectional sense through said succession of membranes, thereby concentrating said solution between alternate pairs of said membranes and diluting said solution between the remaining pairs of said membranes, and periodically interrupting in successive cycles the flow of current in said sense prior to the onset of scale formation for an interval of finite duration corresponding to a substantial fraction of the length of a cycle, the maximum ratio of said duration to the remainder of the cycle being substantially 1:4.

References Cited in the file of this patent
UNITED STATES PATENTS

| | | |
|---|---|---|
| 1,885,810 | Esmarch | Nov. 1, 1932 |
| 2,788,319 | Pearson | Apr. 9, 1957 |
| 2,863,813 | Juda et al. | Dec. 9, 1958 |
| 2,955,999 | Tirrell | Oct. 1, 1960 |